J. G. STEPHENSON.
MOTOR DRIVEN DISK PLOW.
APPLICATION FILED OCT. 31, 1919.
1,361,638.
Patented Dec. 7, 1920.
2 SHEETS—SHEET 1.
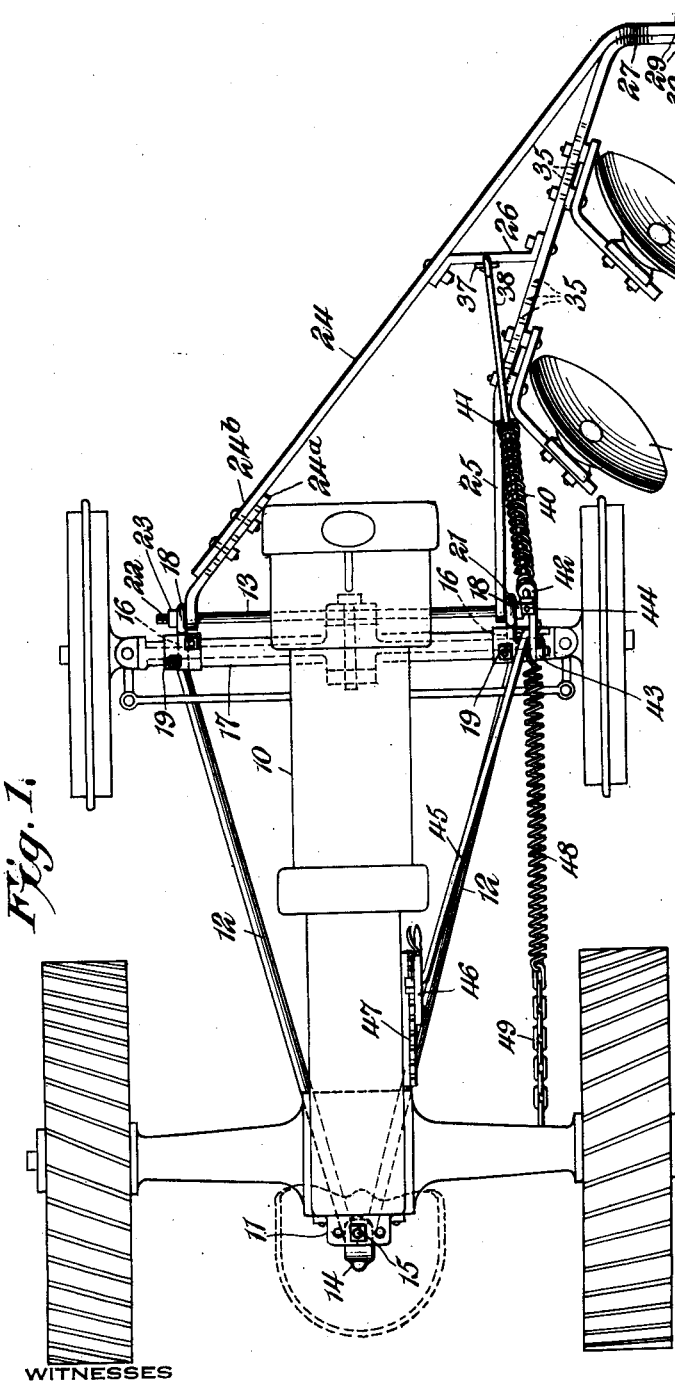
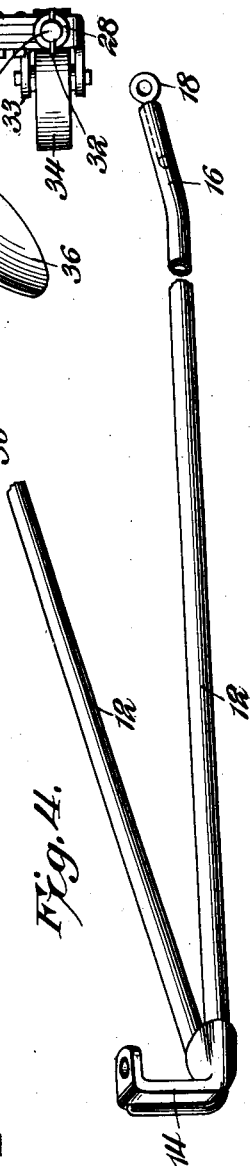
Jay G. Stephenson,
INVENTOR, J. G. STEPHENSON.
MOTOR DRIVEN DISK PLOW.
APPLICATION FILED OCT. 31, 1919.
1,361,638.
Patented Dec. 7, 1920.
2 SHEETS—SHEET 2.
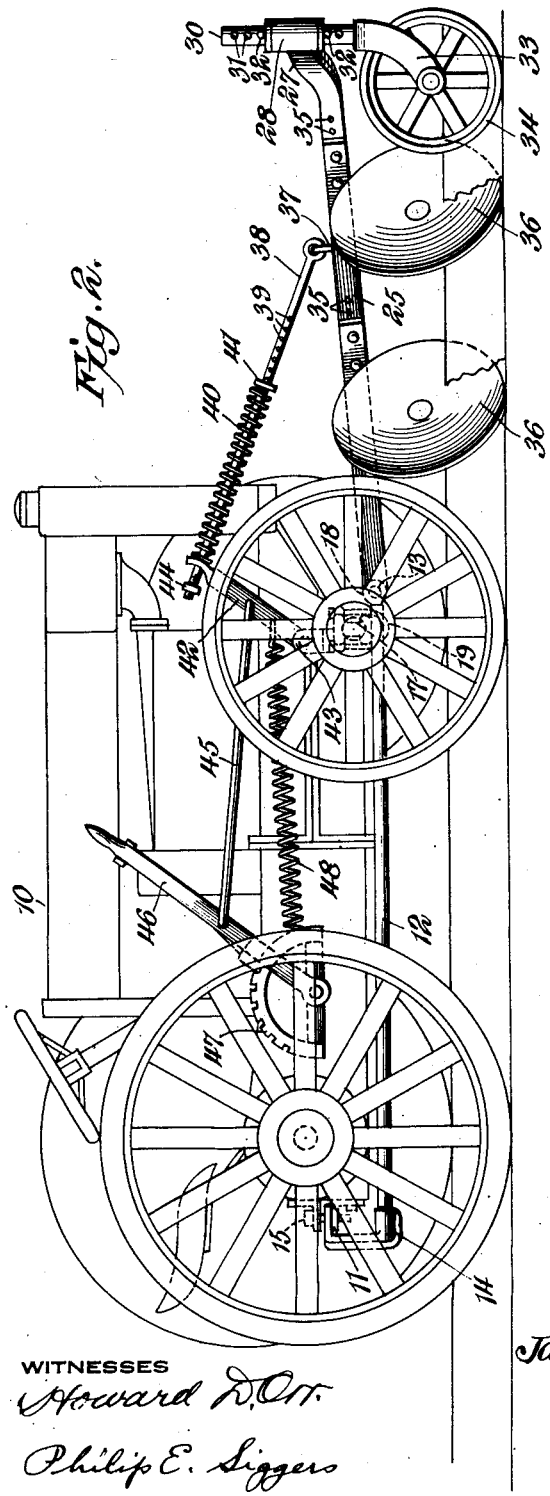
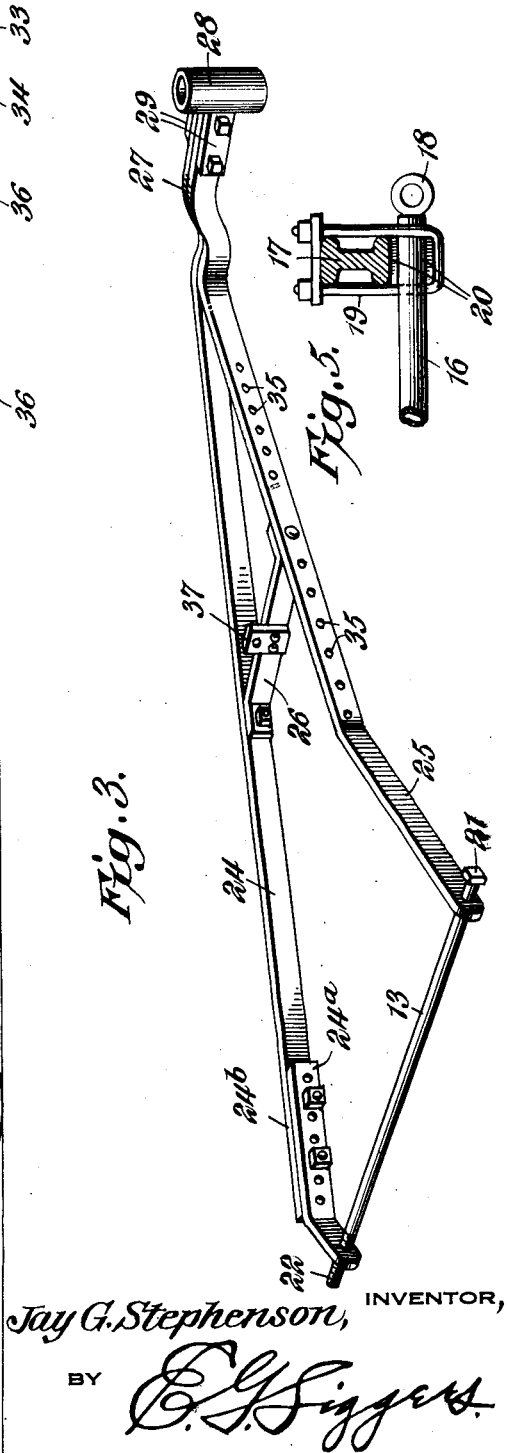
WITNESSES
Howard D. Orr.
Philip E. Siggers
Jay G. Stephenson, INVENTOR,
BY E. G. Siggers.
ATTORNEY

UNITED STATES PATENT OFFICE.

JAY GOULD STEPHENSON, OF ATHENS, TENNESSEE.

MOTOR-DRIVEN DISK PLOW.

1,361,638.  Specification of Letters Patent.  Patented Dec. 7, 1920.

Application filed October 31, 1919. Serial No. 334,674.

*To all whom it may concern:*

Be it known that I, JAY G. STEPHENSON, a citizen of the United States, residing at Athens, in the county of McMinn and State of Tennessee, have invented a new and useful Motor-Driven Disk Plow, of which the following is a specification.

This invention relates to motor plows and particularly to tractor propelled disk plows. The tendency of all plows is to move toward the unplowed ground. Various expedients have been devised for overcoming this fault, one of the most common of which is to set the furrow wheels of the plow frame at an angle with the bottom of the furrow and leaning away from the furrow wall. This arrangement is satisfactory only for certain kinds of soil and it is customary to add weights to such furrow wheels to hold the wheels in the furrow when difficult conditions are encountered. These weights are, of course, troublesome to put on and take off and add materially to the traction.

It is a primary object of this invention to provide a tractor pushed disk plow, so mounted with respect to the tractor and having its disks so arranged, that the tendency to move toward the unplowed ground is overcome or neutralized.

Another object is to provide a disk plow especially adapted for attachment to the front of a Fordson tractor, although well suited for other types of tractors, the location of the plow in front permitting the farmer to view the operation of plowing as it progresses over the ground.

A further object is to provide a three-point suspension for a tractor attached frame on which the disks are mounted.

Other objects are to provide a disk plow which is adjustable for the width and for the depth of the cut so that the soil need be plowed but once, which is easily dismounted from its frame without necessitating the removal of the latter from the tractor, which is held into the soil by a spring, and which is easily lifted from the ground.

The invention will be best understood from a consideration of the following detailed description taken in connection with the accompanying drawings forming part of this specification, with the understanding, however, that the invention is not confined to any strict conformity with the showing of the drawings, but may be changed and modified, so long as such changes and modifications mark no material departure from the salient features of the invention, as expressed in the appended claims.

In the accompanying drawings:

Figure 1 is a top plan view of a Fordson tractor with the invention attached;

Fig. 2 is a side elevation of the same, showing the plow at work;

Fig. 3 is a perspective view of the plow frame proper;

Fig. 4 is a perspective view of the tractor-attached frame, certain parts being broken away or omitted;

Fig. 5 is a detail view showing the connection of the tractor-attached frame with the front axle.

The numeral 10 designates a Fordson tractor or other wheeled or traveling support, which, being of well known construction, is not further described. 11 indicates the draw bar cap of said tractor, which as shown, is customarily provided with three holes for the attachment of the draw bar. The middle one of these holes is a convenient place to secure the frame which is fast to the tractor, and in fact is so used.

The tractor-attached frame, as seen in Figs. 1 and 4, is made up essentially of two parts, a V-shaped brace with two arms 12, and a cross rod 13 secured to the free end of arms 12 but detachable therefrom. These two parts together form a triangular frame. At the angle of the V-shaped brace is a permanently secured bracket 14. A bolt or coupling pin 15 holds the bracket to the draw bar cap.

The free ends of arms 12 are bent into parallel relation to each other, as indicated at 16, and these parallel ends lie crosswise of and are secured to the front axle 17 of the tractor. The arms 12 are preferably of tubular construction so as to receive eye bolts 18 at their ends. The bolts 18 are secured within the arms so as to present only their eyes which extend beyond the ends thereof.

A V-shaped bolt or clip 19 secures each arm 12 to the front axle. The V-bolts or clips 19 are set at an angle to said axle and support the arms beneath the same. Wedges 20 are interposed between each arm and the axle and is held by the clamping action of the V-bolt or clip. These wedges are removable for a purpose to be described. The cross rod 13 has a head 21 at one end, and a threaded portion 22 at its other end and is run through the eyes 18 and secured in place by a nut 23. Thus the cross rod is mounted below and in advance of the front axle and is rigidly held thereto.

The plow frame proper is swingably mounted upon the cross rod 13 so as to turn about the latter as an axis when the disks are to be lifted off the ground. The plow frame comprises two bars 24, 25 and a cross brace 26, the bars 24, 25 being swingable upon the cross rod. At their pivotally mounted ends, the bars 24, 25 are spaced apart the full length of the cross rod. Bar 24 is in two parts, the part 24ª having a series of perforations, and the part 24ᵇ having matching perforations whereby when the parts are in overlapped relation, bolts or equivalent fastening elements may be passed through registering perforations of the parts to allow longitudinal adjustment of the same in the well known manner.

Each of the bars 24, 25 is bent to extend to the right or furrow side of the tractor, and the two bars near their outer ends are brought together and overlapped, as at 27, and secured, the secured section of the bars lying at right angles to the path of the machine and well outside the latter. A sleeve 28 having parallel arms 29 is made fast to the bars at the extreme end thereof, the arms 29 preferably inclosing section 27, while the sleeve is disposed vertically. Mounted within the sleeve is a spindle 30 having perforations 31. Pins 32 are fitted through these perforations at either end of the sleeve and extend beyond the latter, thus permitting vertical adjustment of the spindle. At the lower end of the spindle is a fork 33 carrying a gage or furrow wheel 34. The latter is designed to run in the furrow last cut by the machine.

The bar 25 has several series of perforations 35 intermediate its ends. Disks 36 designed for plowing are secured to the bar by means of bolts passed through selected ones of the perforations 35. The disks 36 are mounted at an angle to the ground and at an angle to the path of the machine. It is customary to mount the disks of disk plows in the manner just stated and no further description is thought necessary.

A special feature of the present invention, which is believed to be novel, is the position of the disks relative to the tractor itself. The rear disk lies immediately in front of and extends across the path of the adjacent front wheel of the tractor, while the second disk (and any subsequent one) lies without the path of the tractor, though between the furrow wheel and the tractor. This peculiar disposition of the disks in advance and to the furrow side of the pushing tractor neutralizes the tendency of the tractor to move to the land side. Hence a tractor equipped with the invention holds a straight course across a field and can be steered with sufficient ease.

While the gage or furrow wheel 34 runs in the furrow last turned, the front and rear wheels on the furrow side of the tractor run in the furrow just made by the rearmost disk. On the next round the furrow traversed by the said tractor wheels will guide the machine by the gage wheel running along it. The plow frame is adjusted at the proper height above the ground by changing the positions of the pins 32 in the spindle, and shifting the sleeve 28 along the spindle. Obviously the higher the adjustment of the frame, the shallower the plowing will be. The plow frame, considered as a unit, inclines upwardly from its connection with the cross rod to where it is joined to the sleeve in all adjusted positions of the latter except the lowermost position. In other words, the frame when in position to plow deepest, will be approximately horizontal; but in all other positions will rise from its pivotal rod to the gage wheel. This inclination enables the frame as a whole to lift easier, as it gives the desirable clearance to ride over obstructions.

In order to hold the plows to their work and to raise them when desirable, a system of levers and springs has been provided, which will now be described.

The cross brace 26, or any other part of the frame, has an ear 37 connected with a rod 38. The rod 38 has perforations 39 at points intermediate its ends and carries a coil spring 40, restrained at one end by a washer and a pin 41 passed through one of the perforations 39. The function of the pin 41 is to help adjust the tension of the spring 40. The other end of the rod is threaded. A perforated end of a lever 42, pivotally mounted on an ear 43 secured upon the front axle, is connected with the threaded end of the rod 38, as by a nut 44. The end of lever 42 is slidable along the rod, restrained by the coil spring 40 and by the nut.

A link 45 connects the lever 42 with a hand lever 46 adjustable on the usual rack 47. A coil spring 48 is secured at one end to lever 42, and at its other end to a chain or similar flexible member 49, which in turn is made fast to the rear axle or any desirable part of the tractor body. The hand lever when adjusted forwardly holds the plows to their work through the mediation of link 45, lever 42, spring 40 and rod 38. When an obstruction is met with the spring 40 will give and the disks will ride over the same, returning immediately to their original depth. If the disks are to be lifted, as when the tractor must be turned, the hand lever will be pulled back, the spring 48 considerably easing the labor of the lifting, since it is stretched when the disks are plowing. The spring 40 is compressed in the position of the parts when plowing. The farther forward the hand lever is set, the greater the compression of spring 40, and the greater the force with which the plows are held in the ground. It will be clear that the weight of the plow frame as well as the force of spring 40 holds the disks in the soil. The wedges 20 are removable so that the triangular frame may be brought up close to the front axle, thus raising the inner or hinged end of the plow. The bar 24 is made extensible so that the width of the cut made by the plows can be varied. There is sufficient play in the parts to allow a limited extension of bar 24. The longer this bar is made the narrower the cut, and vice versa.

When the plow frame is to be detached, the cross rod 13 may be removed by loosening the nut 23 and the rod 38 may be detached from lever 42. This will free the disk plow from the tractor. The tractor-attached frame and levers may be left in place, since these in no way interfere with free use of the tractor apart from the plow, or may be easily removed.

What is claimed is:

1. In a plow, a traveling support, a frame connected to the forward end of the support to swing about a horizontal axis, and a disk mounted upon the frame in such position that a furrow is turned only on the furrow side of the support and in advance of the same.

2. In a plow, a traveling support having a front axle, a frame swingably connected at one end to the front axle, a furrow wheel mounted on the forward end of the frame and wholly outside the path of support, and disk plows mounted upon the frame between the furrow wheel and the support.

3. In a plow, the combination with a wheeled support, of a frame connected to the front end of the support and inclined to the line of draft, a furrow wheel mounted on the forward end of the frame, disks mounted on the frame, one of said disks being in advance of the front furrow side wheel of the support, and another disk lying between the furrow wheel and the first-named disk and wholly outside the path of the support.

4. In a plow, the combination with a traveling support, of a frame connected to the front end thereof and comprising a pair of bars having their front ends inclined or deflected to one side of the line of draft, a gage wheel mounted in the front or outer end of the frame, and disk plows mounted on that bar of the frame which is toward the furrow side of the support, said plows being disposed in rear of the gage wheel and inclined to the line of draft and in advance of the wheels of the support.

5. In a plow, the combination with a traveling support having a front axle, a cross rod secured to the front axle of the support, a pair of bars each pivotally mounted at one end of the cross rod, said bars extending forwardly and inclined outwardly to the furrow side of the support and there joined, a furrow wheel mounted in the bars where joined, the land side bar being extensible longitudinally to vary the width of the cut, disk plows mounted on the furrow side of the bar, and means whereby the cross rod may be adjusted vertically with respect to the front axle.

6. In a plow, the combination with a traveling support having a draw bar cap and a front axle, a triangular frame secured to the support with the apex of the triangle made fast to the draw bar cap and the base of the triangle secured to the front axle below and in advance thereof, a plow frame swingably mounted on the base of the triangular frame toward or from the front axle whereby the plow frame may be raised or lowered at its pivoted end.

7. In a plow, the combination with a traveling support having a front axle, of a frame pivotally mounted at its rear end on the front axle, means for vertically adjusting the pivotal connection with respect to the front axle, a gage wheel carried by the forward end of the frame, and disk plows mounted on the frame in rear of said wheel and in advance of the wheels of the support.

In testimony that I claim the foregoing as my own, I have hereto affixed my signature in the presence of two witnesses.

JAY GOULD STEPHENSON.

Witnesses:
 HUGH N. LOWRY,
 D. F. LANKFORD.